(12) United States Patent
Dabov (10) Patent No.: US 10,629,886 B2
(45) Date of Patent: Apr. 21, 2020

(54) BATTERY PACK SYSTEM

(71) Applicant: Apple Inc., Cupertino, CA (US)

(72) Inventor: Teodor Dabov, San Francisco, CA (US)

(73) Assignee: Apple Inc., Cupertino, CA (US)

(*) Notice: Subject to any disclaimer, the term of this patent is extended or adjusted under 35 U.S.C. 154(b) by 245 days.

(21) Appl. No.: 15/465,477

(22) Filed: Mar. 21, 2017

(65) Prior Publication Data

US 2017/0194618 A1 Jul. 6, 2017

Related U.S. Application Data

(63) Continuation of application No. 14/199,943, filed on Mar. 6, 2014, now abandoned.

(51) Int. Cl.
| | |
|---|---|
| *H01M 2/34* | (2006.01) |
| *H01M 10/0525* | (2010.01) |
| *H01M 2/10* | (2006.01) |
| *H01M 10/058* | (2010.01) |
| *G06F 1/16* | (2006.01) |
| *G06F 1/26* | (2006.01) |
| *H01M 10/42* | (2006.01) |

(52) U.S. Cl.
CPC ............ *H01M 2/34* (2013.01); *G06F 1/1635* (2013.01); *G06F 1/26* (2013.01); *H01M 2/1066* (2013.01); *H01M 10/058* (2013.01); *H01M 10/0525* (2013.01); *H01M 10/425* (2013.01); *H01M 2010/4271* (2013.01); *H01M 2200/00* (2013.01); *H01M 2220/30* (2013.01); *Y02T 10/7011* (2013.01); *Y10T 29/4911* (2015.01)

(58) Field of Classification Search
CPC ............................ H01M 2/34; H01M 10/4257
USPC .......................................................... 429/93
See application file for complete search history.

(56) References Cited

U.S. PATENT DOCUMENTS

| | | |
|---|---|---|
| 2,798,895 A | 7/1957 | Nowotny |
| 2,798,896 A | 7/1957 | Bly |
| 4,152,825 A | 5/1979 | Bruneau |
| 4,344,603 A | 8/1982 | Hozumi et al. |
| 4,455,026 A | 6/1984 | Pinkus et al. |
| 5,238,222 A | 8/1993 | Sumida et al. |
| 5,580,676 A | 12/1996 | Honda et al. |
| 6,106,973 A | 8/2000 | Sonozaki et al. |
| 6,174,164 B1 | 1/2001 | Masjedi |

(Continued)

FOREIGN PATENT DOCUMENTS

| | | |
|---|---|---|
| CN | 101702412 | 5/2010 |
| EP | 0792741 | 9/1997 |

(Continued)

OTHER PUBLICATIONS

U.S. Appl. No. 14/199,943, Advisory Action dated Feb. 2, 2017, 4 pages.

(Continued)

*Primary Examiner* — James Lee
(74) *Attorney, Agent, or Firm* — Kilpatrick Townsend & Stockton, LLP (57) ABSTRACT

An improved battery pack and system including such battery pack is disclosed. The battery pack includes a power control module positioned to allow for increased battery power or reduced battery pack size.

18 Claims, 5 Drawing Sheets

(56) References Cited

U.S. PATENT DOCUMENTS

| | | | |
|---|---|---|---|
| 6,225,778 B1 * | 5/2001 | Hayama | H01M 2/1061 320/112 |
| 6,358,644 B1 | 3/2002 | Shibata et al. | |
| 6,368,744 B1 | 4/2002 | Hatazawa et al. | |
| 6,528,204 B1 | 3/2003 | Hikmet et al. | |
| 6,549,756 B1 | 4/2003 | Engstrom | |
| 6,790,178 B1 | 9/2004 | Mault et al. | |
| 6,924,551 B2 | 8/2005 | Rumer et al. | |
| 7,103,407 B2 | 9/2006 | Hjelt et al. | |
| 7,270,910 B2 | 9/2007 | Yahnker et al. | |
| 7,288,340 B2 | 10/2007 | Iwamoto | |
| 7,356,923 B2 | 4/2008 | Honer | |
| 7,622,895 B1 | 11/2009 | Griffin | |
| 7,663,064 B2 | 2/2010 | Dutta et al. | |
| 7,714,542 B2 | 5/2010 | Lee et al. | |
| 7,887,948 B2 | 2/2011 | Jang et al. | |
| 7,910,243 B2 | 3/2011 | Koh et al. | |
| 7,948,208 B2 | 5/2011 | Partovi et al. | |
| 7,952,322 B2 | 5/2011 | Partovi et al. | |
| 7,972,721 B2 | 7/2011 | Kozu et al. | |
| 7,976,981 B2 | 7/2011 | Lee | |
| 8,031,122 B2 | 10/2011 | Jang et al. | |
| 8,034,477 B2 | 10/2011 | Yamada | |
| 8,119,278 B2 | 2/2012 | Bailey et al. | |
| 8,124,269 B2 | 2/2012 | Takahashi et al. | |
| 8,169,185 B2 | 5/2012 | Partovi et al. | |
| 8,241,786 B2 | 8/2012 | Taniguchi et al. | |
| 8,259,013 B2 | 9/2012 | Jang et al. | |
| 8,260,371 B2 | 9/2012 | Kawata et al. | |
| 8,293,402 B2 | 10/2012 | Lee | |
| 8,427,825 B2 | 4/2013 | Szczypinski | |
| 8,445,125 B2 | 5/2013 | Baek | |
| 8,518,569 B2 | 8/2013 | Murphy et al. | |
| 8,526,998 B2 | 9/2013 | Koide et al. | |
| 8,558,509 B2 | 10/2013 | He et al. | |
| 8,603,670 B2 | 12/2013 | Taniguchi et al. | |
| 8,629,652 B2 | 1/2014 | Partovi et al. | |
| 8,629,654 B2 | 1/2014 | Partovi et al. | |
| 8,679,674 B2 | 3/2014 | Liang et al. | |
| 8,778,529 B2 | 7/2014 | Seo | |
| 8,890,470 B2 | 11/2014 | Partovi | |
| 8,896,264 B2 | 11/2014 | Partovi | |
| 8,901,881 B2 | 12/2014 | Partovi | |
| 8,942,409 B2 | 1/2015 | Kantor et al. | |
| 8,947,047 B2 | 2/2015 | Partovi et al. | |
| 8,999,566 B2 | 4/2015 | Chung et al. | |
| 9,106,083 B2 | 8/2015 | Partovi | |
| 9,112,362 B2 | 8/2015 | Partovi | |
| 9,112,363 B2 | 8/2015 | Partovi | |
| 9,112,364 B2 | 8/2015 | Partovi | |
| 9,178,369 B2 | 11/2015 | Partovi | |
| 9,301,034 B2 | 3/2016 | Kantor et al. | |
| 2002/0094475 A1 | 7/2002 | Aoyama | |
| 2003/0129483 A1 | 7/2003 | Gross | |
| 2005/0142439 A1 | 6/2005 | Lee et al. | |
| 2006/0139859 A1 * | 6/2006 | Wong | G06F 1/1632 361/679.02 |
| 2007/0154794 A1 | 7/2007 | Kim et al. | |
| 2007/0260136 A1 | 11/2007 | Hunter et al. | |
| 2007/0264535 A1 | 11/2007 | Lee et al. | |
| 2008/0001573 A1 | 1/2008 | Carey | |
| 2008/0286644 A1 | 11/2008 | Yeo | |
| 2009/0246620 A1 | 10/2009 | Lee et al. | |
| 2009/0317708 A1 | 12/2009 | Brandl et al. | |
| 2010/0052603 A1 | 3/2010 | Bourilkov et al. | |
| 2010/0081049 A1 | 4/2010 | Holl et al. | |
| 2010/0178549 A1 * | 7/2010 | Moom | H01M 2/202 429/158 |
| 2010/0316911 A1 | 12/2010 | Tesson et al. | |
| 2011/0014954 A1 | 1/2011 | Dossas et al. | |
| 2011/0043309 A1 | 2/2011 | Wamala et al. | |
| 2011/0050164 A1 | 3/2011 | Partovi et al. | |
| 2011/0175569 A1 | 7/2011 | Austin | |
| 2011/0215480 A1 | 9/2011 | Gorczyca et al. | |
| 2011/0221385 A1 | 9/2011 | Partovi et al. | |
| 2011/0223447 A1 | 9/2011 | Ignor et al. | |
| 2011/0236727 A1 | 9/2011 | Jang | |
| 2011/0287318 A1 | 11/2011 | Loveness et al. | |
| 2011/0304984 A1 | 12/2011 | McClure et al. | |
| 2012/0116176 A1 | 5/2012 | Moravec et al. | |
| 2012/0121944 A1 | 5/2012 | Yamamoto et al. | |
| 2012/0231299 A1 * | 9/2012 | Dai | H01M 2/021 429/7 |
| 2012/0305605 A1 | 12/2012 | Vassaux et al. | |
| 2013/0034763 A1 | 2/2013 | Byun | |
| 2013/0053110 A1 | 2/2013 | Pope et al. | |
| 2013/0071696 A1 | 3/2013 | Kim et al. | |
| 2013/0093388 A1 | 4/2013 | Partovi | |
| 2013/0099563 A1 | 4/2013 | Partovi et al. | |
| 2013/0171490 A1 | 7/2013 | Rothkopf et al. | |
| 2013/0249479 A1 | 9/2013 | Partovi | |
| 2013/0260677 A1 | 10/2013 | Partovi | |
| 2013/0271069 A1 | 10/2013 | Partovi | |
| 2013/0285604 A1 | 10/2013 | Partovi | |
| 2013/0285605 A1 | 10/2013 | Partovi | |
| 2013/0300204 A1 | 11/2013 | Partovi | |
| 2013/0323055 A1 | 12/2013 | Eden | |
| 2014/0050948 A1 | 2/2014 | Hashimoto et al. | |
| 2014/0065474 A1 | 3/2014 | Werner et al. | |
| 2014/0103873 A1 | 4/2014 | Partovi et al. | |
| 2014/0132210 A1 | 5/2014 | Partovi | |
| 2014/0147703 A1 | 5/2014 | Werner et al. | |
| 2014/0147730 A1 | 5/2014 | Werner | |
| 2014/0191568 A1 | 7/2014 | Partovi | |
| 2014/0306654 A1 | 10/2014 | Partovi | |
| 2015/0043156 A1 | 2/2015 | Jain et al. | |
| 2015/0130412 A1 | 5/2015 | Partovi | |
| 2015/0145475 A1 | 5/2015 | Partovi et al. | |
| 2015/0185055 A1 | 7/2015 | King | |
| 2015/0220109 A1 | 8/2015 | Von Badinski et al. | |
| 2015/0255776 A1 | 9/2015 | Dabov | |
| 2015/0256007 A1 | 9/2015 | Zadesky et al. | |
| 2016/0064780 A1 | 3/2016 | Jarvis et al. | |
| 2016/0080614 A1 | 3/2016 | Hollinger | |

FOREIGN PATENT DOCUMENTS

| | | |
|---|---|---|
| EP | 1931010 | 6/2008 |
| EP | 2540221 | 1/2013 |
| EP | 2653053 | 10/2013 |
| JP | 61032951 | 2/1986 |
| JP | 63314770 | 12/1988 |
| JP | 10012200 | 1/1998 |
| JP | 2000058018 | 2/2000 |
| JP | 2001118547 | 4/2001 |
| JP | 2001250515 | 9/2001 |
| JP | 2001250516 | 9/2001 |
| JP | 2001332752 | 11/2001 |
| JP | 2005108750 | 4/2005 |
| JP | 2005129260 | 5/2005 |
| JP | 2005268138 | 9/2005 |
| JP | 2007048725 | 2/2007 |
| JP | 2007165200 | 6/2007 |
| JP | 2010021074 | 1/2010 |
| KR | 20010007769 | 2/2001 |
| KR | 20090075396 | 7/2009 |
| WO | 0041252 | 7/2000 |
| WO | 2008023199 | 2/2008 |
| WO | 2011000239 | 1/2011 |
| WO | 2011095758 | 8/2011 |

OTHER PUBLICATIONS

U.S. Appl. No. 14/199,943, Final Office Action dated Oct. 21, 2016, 14 pages.

U.S. Appl. No. 14/199,943, Non-Final Office Action dated Mar. 11, 2016, 15 pages.

U.S. Appl. No. 14/199,943, Restriction Requirement dated Nov. 25, 2015, 8 pages.

* cited by examiner

BATTERY PACK SYSTEM

CROSS-REFERENCES TO RELATED APPLICATIONS

This application is a continuation of U.S. patent application Ser. No. 14/199,943, filed Mar. 6, 2014, which is incorporated by reference.

BACKGROUND

The described embodiments relate generally to a battery pack system. More particularly, the present embodiments relate to improvements in packaging lithium-ion battery packs used in electronic devices to reduce the battery pack size and to improve system performance.

Recent advances in portable computing have utilized lithium-ion batteries to provide power to laptops computers, portable media players, personal digital assistants (PDAs), cell phones, tablets and other electronic equipment. Lithium-ion batteries are favored because, pound for pound, they are some of the most energetic rechargeable batteries available. They have a number of important advantages over competing technologies. They are generally much lighter than other types of rechargeable batteries of the same size because the electrodes of a lithium-ion battery are made of lightweight lithium and carbon.

In addition to consumer electronics, lithium-ion batteries are also popular for use in military, electric vehicle and aerospace applications. Lithium-ion batteries may be used in place of lead acid batteries in golf carts and utility vehicles. Lithium-ion batteries provide similar voltage levels as lead acid batteries so no modification of the vehicle's drive system is needed. The batteries could also be used for electric tools, medical equipment and other uses.

Lithium is a highly reactive element, meaning that a lot of energy can be stored in its atomic bonds. This translates into a very high energy density for lithium-ion batteries. For example, a typical lithium-ion battery can store 150 watt-hours of electricity in 1 kilogram of battery. A NiMH (nickel-metal hydride) battery pack can store perhaps 100 watt-hours per kilogram, although 60 to 70 watt-hours might be more typical. A lead-acid battery can store only 25 watt-hours per kilogram. Using lead-acid technology, it takes 6 kilograms to store the same amount of energy that a 1 kilogram lithium-ion battery can handle. For lightweight electronic devices, this is a significant advantage.

In addition to being lightweight, a lithium-ion battery pack may lose only about 5 percent of its charge per month, compared to a 20 percent loss per month for NiMH batteries. Lithium-ion battery packs have no memory effect, which means that a user does not have to completely discharge them before recharging, as with some other battery types. Lithium-ion batteries can also be recharged hundreds of times while other battery types may have more limited useful lives.

While lithium-ion batteries have many positive advantages, there are some disadvantages also. For example, lithium-ion battery packs require that a protection circuit be included to maintain voltage and current within safe limits. It is possible that failure of the battery pack due to overheating could cause harm to the accompanying electronic device, possibly even melting the device housing in certain instances. In order to avoid such situations, a protection circuit is generally included in a lithium-ion battery pack. Built into each pack, the protection circuit limits the peak voltage of each cell during charge and prevents the cell voltage from dropping too low on discharge. In addition, the cell temperature is monitored to prevent temperature extremes. With these precautions in place, the possibility of metallic lithium plating occurring due to overcharge may be greatly reduced.

However, while the protection circuits are included for safety reasons they tend to make the battery packs relatively more expensive and the inclusion of protection circuits make the battery pack larger than it would otherwise be. This increase in size may ameliorate some of the advantages discussed above as electronic devices become increasingly smaller and more compact.

A jelly roll design is the design used in many rechargeable batteries, and often for those batteries used in portable electronic devices. In this design, an insulating sheet is laid down, then a thin layer of an anode material is laid down, a separator layer is applied, and a cathode material is layered on top. This sandwich is then rolled up and inserted into a hollow casing. The battery, once wrapped, may be sealed in a flexible container. The container may have a tail or seam where the flexible material seals to itself in order to encompass the battery. Electrodes may extend through the tail in order to provide an electrical connection between the battery and internal components. The electrodes may exit the flexible container, bend, and be electrically connected to various components as desired.

Therefore, it would be desirable to have a battery pack for an electronic device which is more compact, while still including the safety features associated with a protection circuit built into the battery pack.

SUMMARY

A battery pack includes a power control module to protect the battery from being overcharged or improperly discharged. The power control module is located on the battery pack in a location that permits the space for the battery portion itself to be utilized to maximum efficiency. By locating the power control module on the side of the battery pack housing opposite to the battery portion, improved overall power performance of the system may be achieved. In some embodiments, increased battery performance and power may be achieved without increasing the overall size of the battery pack. In another embodiment the overall battery pack size may be reduced while maintaining the same power performance as with the conventionally sized battery pack.

A system including an electronic device which utilizes various embodiments of the battery back is disclosed. The electronic device may be a laptop computer, tablet, smartphone or the like and the power needs of the device may be met in a more efficient manner utilizing disclosed embodiments. The battery pack may be made smaller thus reducing the amount of space which must be allocated in the electronic device for the battery pack. In another embodiment, increased battery size may be achieved while maintain the size of the allocated space for the battery pack. By reducing required space or increasing the amount of power supplied to the electronic device from the battery pack for a given size, improved efficiency and performance as well as increased convenience to a user of the electronic device may be achieved with disclosed embodiments.

BRIEF DESCRIPTION OF THE DRAWINGS

The disclosure will be readily understood by the following detailed description in conjunction with the accompanying drawings, wherein like reference numerals designate like structural elements, and in which.

DESCRIPTION OF EXEMPLARY EMBODIMENTS

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The following disclosure relates to a battery pack which may be used in conjunction with an electronic device such as a laptop computer, portable media player, personal digital assistant (PDA), cell phone, tablet or other electronic equipment. In a particular embodiment, the battery pack includes a lithium-ion battery and a power control module or safety circuit which is included to maintain voltage and current within safe limits. Built into each pack, the protection circuit limits the peak voltage of each cell during charge and prevents the cell voltage from dropping too low on discharge. In addition, the cell temperature may be monitored to prevent temperature extremes which could damage the battery or the electronic device.

These and other embodiments are discussed below with reference to FIGS. 1-7. However, those skilled in the art will readily appreciate that the detailed description given herein with respect to these Figures is for explanatory purposes only and should not be construed as limiting.

Figure 1:
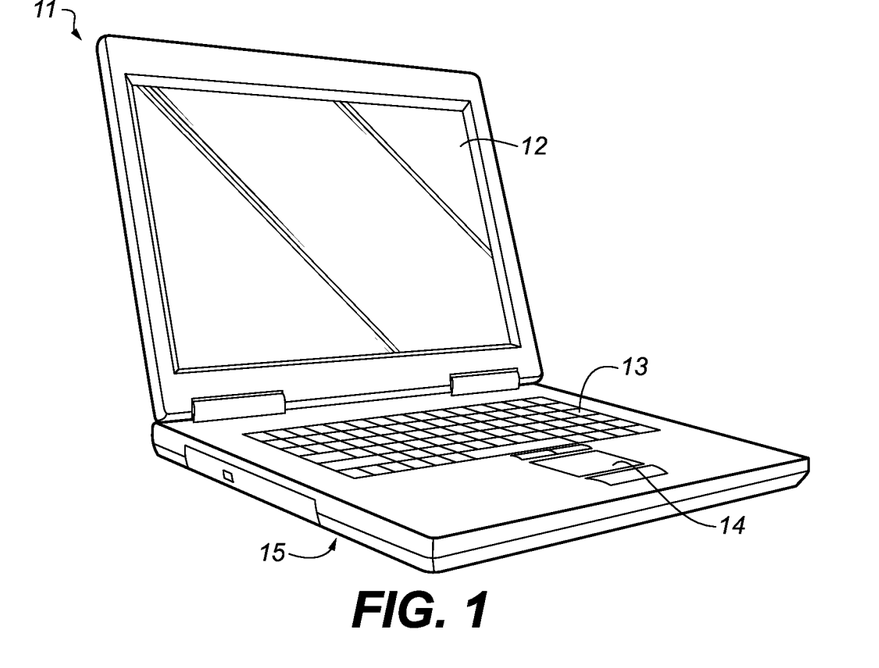
FIG. 1 shows a perspective view of an electronic device.
Figure 2:
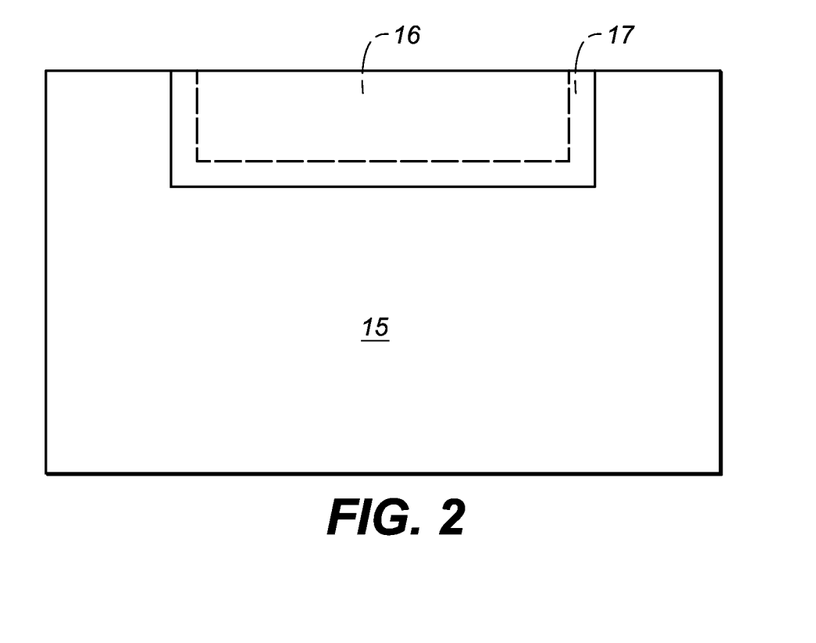
FIG. 2 shows the underside of an electronic device.

FIG. 1 illustrates a laptop computer 11 which may include a screen 12 and a keyboard 13 as well as a mouse pad 14. Laptop computer 11 may also include a battery pack (not shown) which is generally located on the underside 15 of laptop computer 11. The battery pack is used to provide power to laptop computer 11 and its electronic components. As stated above, the electronic device in this embodiment could also be a portable media player, cell phone, or other Referring to FIG. 2, the underside 15 of laptop computer 11 is shown which includes a battery pack 16 inserted into a compartment 17 in the underside 15 of laptop computer 11. Battery pack 16 may be electromagnetically connected to the main logic board (not shown) and other electronic circuit board or components.

Figure 3:
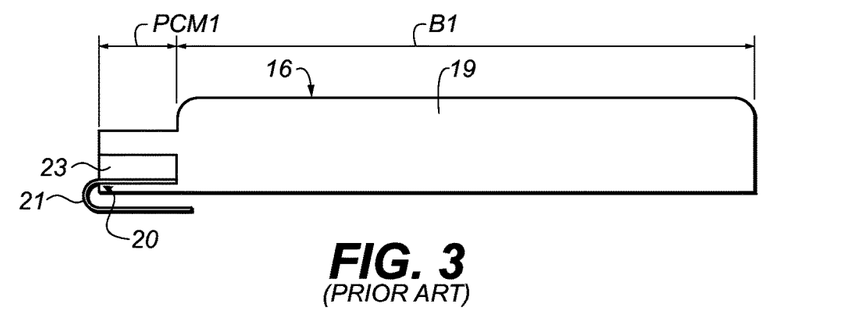
FIG. 3 shows a side view of a conventional battery pack.

Referring to FIG. 3, a side view of a conventional battery pack 16 is shown. Battery pack 16 includes battery portion 19, a power control module 23 and an electrode attachment portion 20 which attaches electrode 21 to battery portion 19. Power control module 23 is shown mounted adjacent to battery portion 19 and electrode attachment portion 20. Depending upon the size and power rating of battery portion 19, battery portion 19 has a length of B1. Power control module 23 also has a dimension of length PCM 1. This configuration results in an overall length of battery pack 16 of L1 which is B1+PCM1=L1. L1 is the approximate length of compartment 17 in electronic device 11 as shown and described in FIG. 4 below.

The power control module 23 shown in FIG. 3 is included for safety reasons as described above. That is, in certain battery types, such as lithium-ion batteries, it is important to control the charge and discharge rate of the lithium-ion battery to prevent inadvertent failure of the battery portion 19 which could damage electronic device 11 and/or its electronic circuitry 22. In addition, as discussed above, power control module 23 may monitor the temperature of battery portion 19 in order to prevent inadvertent overheating of battery portion 19 which could result in failure of battery portion 19.

Figure 4:
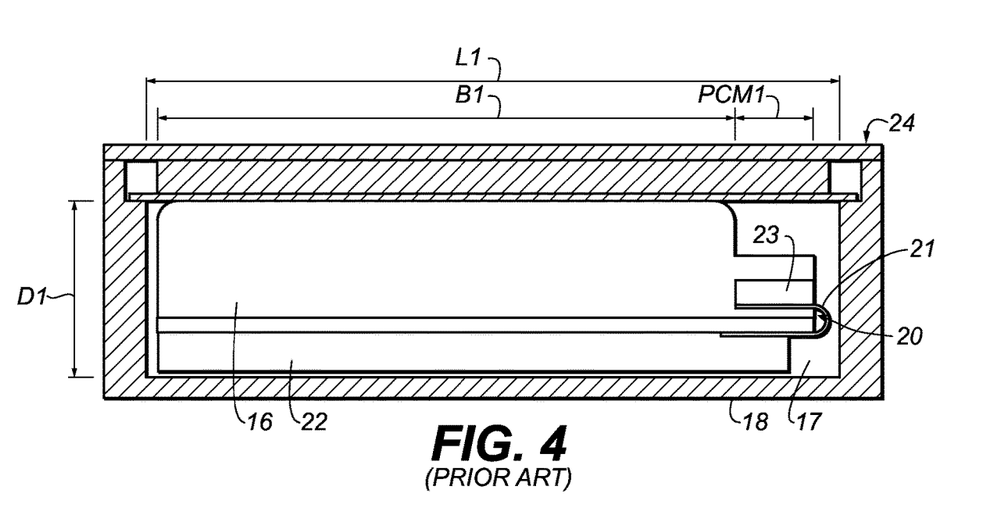
FIG. 4 shows a side cutaway view of an electronic device including a conventional battery pack.

Referring to FIG. 4, a cutaway side view of electronic device 11 includes a housing 18. Housing 18 includes a compartment 17 which contains battery pack 16 described above with respect to FIG. 3. Battery pack 16 includes a battery 19 which is connected through electrode connection 20 to electrode 21. Electrode 21 connects battery pack 16 to a main logic or circuit board 22. In this conventional battery pack, a power control module 23 is included in battery pack 16 and is positioned adjacent to electrode attachment portion 20, electrode 21 and battery portion 19 above the main logic board 22 and other electronic components. Battery portion 19 may be a lithium-ion battery or other battery type. Compartment 17 in housing 18 is defined by a width (measured from above and not shown), depth (D1) and length (L1) which is sized to allow insertion and removal of battery pack 16 as will be discussed in more detail below. That is, a cover portion 24 in underside 15 of electronic device 11 may be opened to allow access to battery pack 16. Battery pack 16 may be removed by a user and replaced or recharged as needed.

Figure 5:
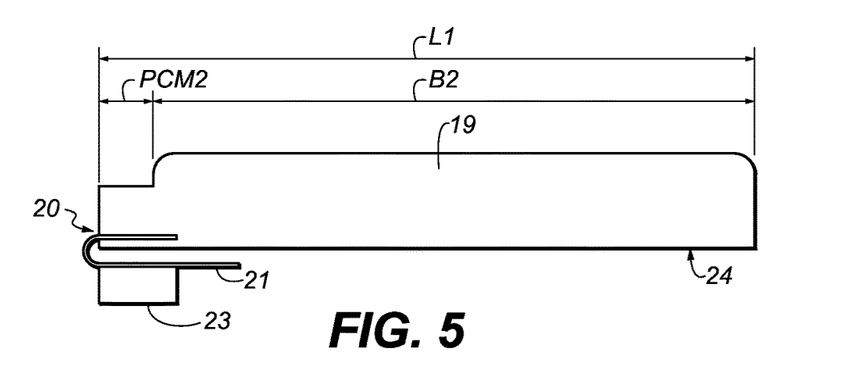
FIG. 5 shows a side view of a battery pack in accordance with one embodiment.

Referring to FIG. 5, a side view of an embodiment of a battery pack 24 is shown which includes power control module 23 mounted below electrode 21. By locating power control module 23 below electrode 21, battery portion 19 may be made larger with a length of B2 as shown in FIG. 5 while still maintain an overall length for battery pack 24 of L1. By making battery portion 19 larger, an increase in power may be achieved. That is more space may be provided for the three primary functional components of a lithium-ion battery: the positive and negative electrodes; and the electrolyte. The overall length L1 of battery pack 24 remains the same as with battery pack 16 described above such that battery pack 24 may fit into compartment 17 in electronic device 11 as described above but the increased power increases the usefulness of electronic device 11 by enabling more capabilities.

Figure 6:
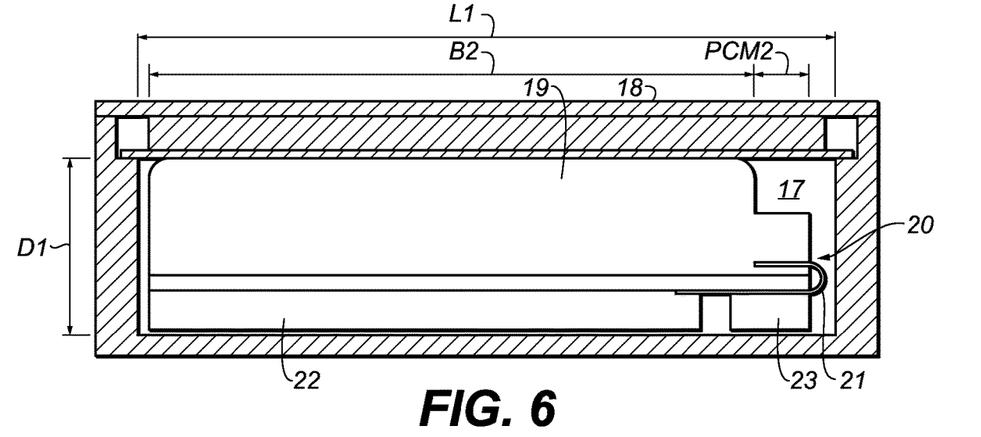
FIG. 6 shows a side cutaway view of an electronic device including a battery pack in accordance with one embodiment.

Referring to FIG. 6, the battery pack 16 of FIG. 5 is shown in a cutaway view of compartment 17 of electronic device 11. The overall length of battery pack 16 is L1 as was the case with the conventional battery pack 16 shown in FIG. 4.

Power control module 23 is shown mounted below electrode attachment portion 21 as described above with respect to FIG. 5. Thus, in this embodiment, battery portion 19 may be made larger resulting in more power to electronic device 11 and/or longer battery life between recharging of battery portion 19. That is, battery portion 19 has a length B2 as described above with respect to FIG. 5. Thus, while the overall length L1 of battery pack 24 is the same as that of conventional battery pack 16 in FIG. 4, the larger battery portion length B2 results in additional amount of battery power which may be delivered to electronic device 11 which can result in improved performance and enabling additional capabilities.

Figure 7:
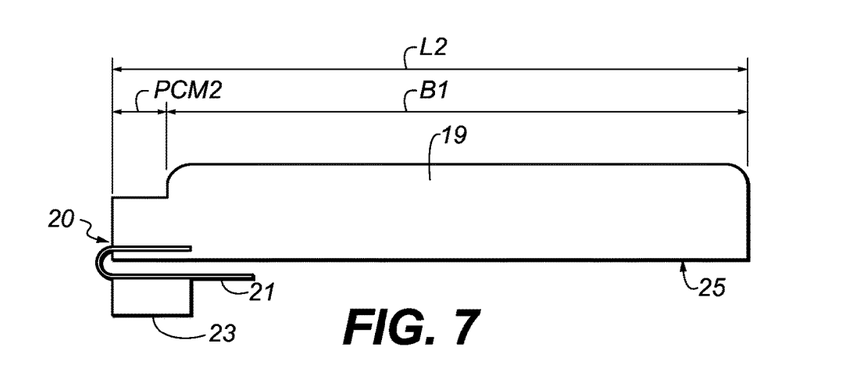
FIG. 7 shows a side view of a battery pack in accordance with another embodiment.

Referring to FIG. 7, another embodiment of a battery pack is shown. In this embodiment, a battery pack 25 includes a battery portion 19 which includes a length B1 as was shown in the embodiment described in FIGS. 3 and 4. However, because power control module 23 is located on the underside of electrode attachment portion 21, the overall length of battery pack 25 is L2 which is less than length L1 of the battery packs described in FIGS. 3 and 4. Thus battery pack 25 has the same battery power level as battery pack 16 shown in FIGS. 3 and 4 because it has the same sized battery portion 19. However, battery pack 25 has a length L2 that is less than length L1 of battery pack 16 and thus may allow a reduction in the size of electronic device 11. As the size of electronic devices continues to decrease, reducing the size of a battery pack while maintaining the same power capabilities may be significant.

Figure 8:
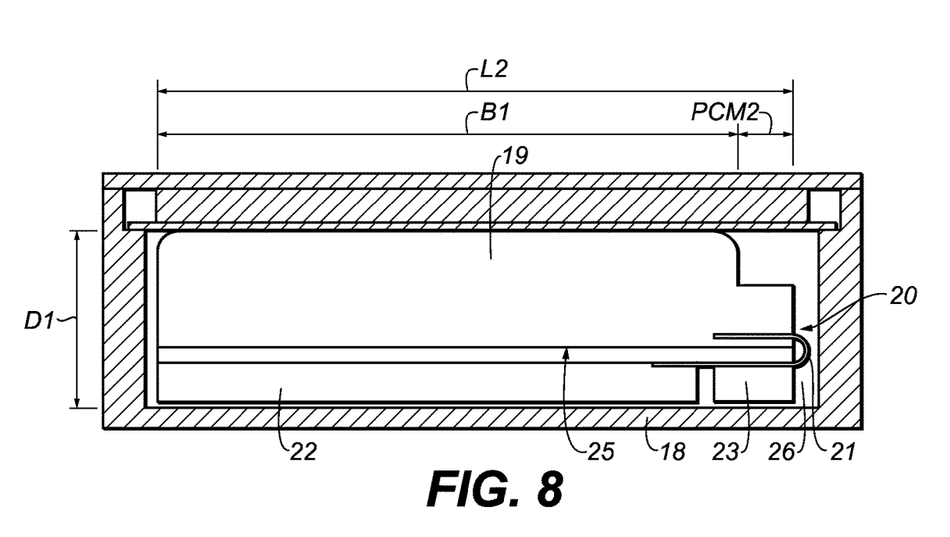
FIG. 8 shows a side cutaway view of an electronic device including a battery pack in accordance with another embodiment.

Referring to FIG. 8, the battery pack 25 of FIG. 7 is shown in a compartment 26 of electronic device 11. The overall length of battery pack 25 is L2 as shown in FIG. 7 which is less than the length L1 of the battery pack shown in FIG. 3. Power control module 23 is shown mounted below electrode 21 as described above with respect to FIG. 7. In this embodiment, battery portion 19 has a length B1 as described above in FIG. 7 and FIG. 3. This means that battery pack 25 may provide the same power performance as battery pack 19 shown in FIG. 3. However, because the length L2 of battery pack 25 is less than the length L1 of battery pack 16, the length of compartment 26 may be smaller than the length of compartment 17 in FIGS. 4 and 6. Thus, the same battery power level can be provided to electronic device 11 as with the battery pack 16 of FIGS. 3 and 4 but, because the length L2 of compartment 26 in FIG. 7 is less than length L1 of compartment 17 in FIG. 4, the size of electronic device may either be reduced or, if the size of electronic device is maintained, additional components may be added resulting in increased performance or convenience to a user.

Figure 9:
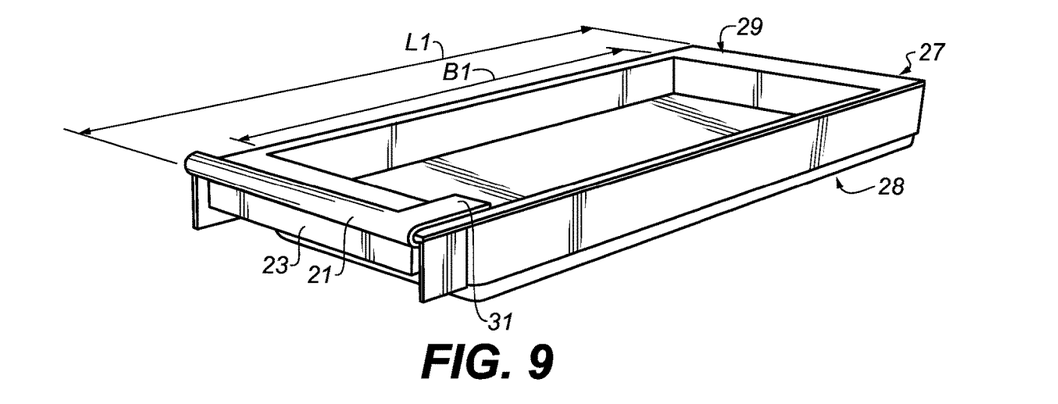
FIG. 9 shows a perspective view of a conventional battery pack housing.

Referring to FIG. 9, a perspective view of a housing for conventional battery pack 16 is shown. Housing 27 is a tray like structure that contains the battery portion (not shown) adjacent upper surface 28. The length B1 of tray in housing 27 is sufficient to contain the battery portion of a size having a particular power capability. In this conventional battery pack, housing 27 has power control module 23 located adjacent to electrode portion 21 and upper surface 28. A main logic board or other circuitry may connect to electrode portion 21 at flexible attachment point 31 on lower surface 29. Battery pack 16 has an overall length of L1 as shown.

Figure 10:
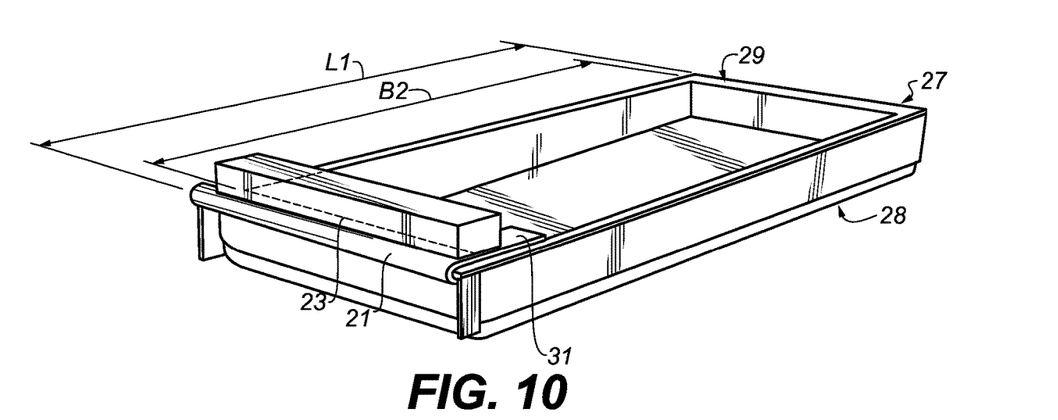
FIG. 10 shows a perspective view of a battery pack housing in accordance with one embodiment.

Referring to FIG. 10, a perspective view of an embodiment is shown including housing 27 as described in FIG. 9 above. That is, a power source, which may be a battery portion is contained on the upper surface 28 of housing 27 and an electrode 21 is connected to the power source. In this embodiment, power control module 23 is moved adjacent to electrode portion 21 and lower surface 29. Flexible attachment point 31 may be extended as necessary or desirable to provide sufficient connection to main logic board or other circuitry (not shown). By moving power control module 23 to this location adjacent lower surface 29, the amount of space to contain battery portion (not shown) is increased from that shown in FIG. 9. That is, the length B2 of the space to contain battery portion 19 is increased from length B1 shown in FIG. 9. Thus, a larger battery portion 19 having higher power capability may be included in housing 27 without increasing the overall length L1 of the battery pack which remains the same as L1 in FIG. 9.

Figure 11:
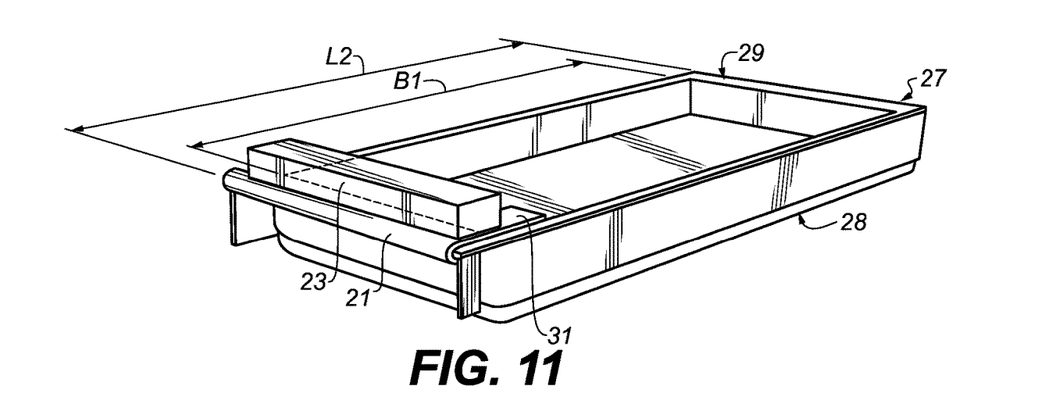
FIG. 11 shows a perspective view of a battery pack housing in accordance with another embodiment.

Referring to FIG. 11, an alternate embodiment of a battery pack is shown. In this embodiment, power control module 23 is moved adjacent to flexible attachment point 31 on electrode portion 21 as is described above with respect to FIG. 10. As with the embodiment shown in FIG. 10 attachment point 31 may be extended as necessary or desirable to provide sufficient connection to main logic board or other circuitry (not shown). In the embodiment shown in FIG. 11, however, housing 27 has been shortened such that the overall length L2 of the battery pack is less than length L1 of the battery pack described in FIGS. 9 and 10. The length B1 of the tray portion in housing 27 is maintained as in FIG. 9 such that the same sized battery portion as is used in FIG. 9 may be included in this embodiment. Thus a more compact battery pack having a shorter overall length L2 may be used to provide power to electronic device 11 without reducing the amount of such provided power. With this embodiment, either the overall size of electronic device could be reduced, or additional components could be added to electronic device 11 without increasing the overall size of electronic device 11. That is, the size of battery compartment 17 in FIG. 2 could be reduced without sacrificing power capabilities or device performance. By adding additional components to the freed space, improved performance and/or increased convenience to a user of electronic device 11 may be accomplished. Similarly, reducing the size of electronic device 11 would also result in increased convenience to a user of the device.

As discussed above, (for example with respect to FIG. 4) both conventional battery packs and embodiments of battery packs disclosed herein may be inserted into and removed from electronic devices such as laptop computers. The battery packs may then be replaced, recharged or repaired as needed. The embodiments disclosed herein do not add any complexity to this removal process but do allow for increased efficiency or reduction in size of the device as discussed above. The absolute amount of reduction in size from, for example, L1 to L2, is provided for illustrative purposes only. It is the relocation of power control module 23 to a bottom surface of the battery pack that permits the increased efficiency or reduced size. The electrodes 21 on the battery packs may interface with electrical connections such as the main logic boards and other electronic circuitry. While lithium-ion batteries have been discussed as the power source in battery portions 19 and 25, it can be appreciated that embodiments described herein could be employed with battery portions employing other battery chemistries which utilize power control modules to control battery pack functionality for safety and efficiency improvements.

Figure 12:
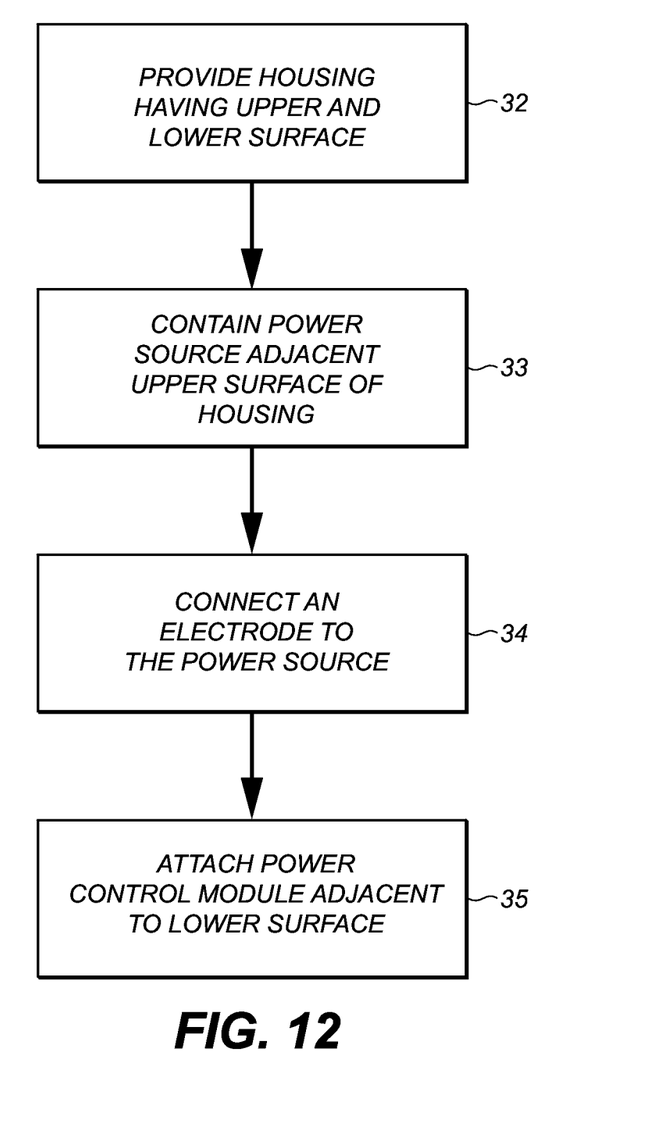
FIG. 12 shows a flow chart illustrating a method for making a battery pack.

Referring to FIG. 12, a flow chart for a method of making a battery pack is shown. In step 32, a housing having an upper and a lower surface is provided. In step 33, a power source is contained adjacent to the upper surface in the housing. An electrode is connected to the power source in step 34. A power control module is attached adjacent to the lower surface of the housing in step 35. The power source may be a lithium-ion battery and the power control module is attached adjacent the lower surface such that it is contained with a battery pack length defined by the battery portion and the attached electrode.

It can be appreciated from the above description that moving power control module 23 on a lithium-ion or other battery type, may result in improved efficiencies to battery packs and to the electronic or other devices that utilize them. By improving such efficiencies, greater performance and convenience may be provided to a user of electronic devices. However, embodiments disclosed herein could be used in other than electronic devices. For example, electric powered automobiles or other electric powered forms of transportation such as utility vehicles utilize battery packs and may benefit from implementation of the embodiments disclosed herein. In addition, electric tools, medical equipment and other uses may benefit from these embodiments.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not target to be exhaustive or to limit the embodiments to the precise forms disclosed. It will be apparent to one of ordinary skill in the art that many modifications and variations are possible in view of the above teachings.

What is claimed is:

1. A battery pack for an electronic device, the battery pack comprising:
   a housing;
   a main logic board in the housing;
   a battery portion having a bottom surface located on a top surface of the main logic board, the battery portion located in the housing and between a top surface of the housing and the main logic board;
   an electrode connected to the battery portion; and
   a power control module separate from the main logic board, laterally adjacent to the main logic board, and directly contacting the electrode, wherein the bottom surface of the battery portion is further located over a top surface of the power control.

2. The battery pack for an electronic device of claim 1 further comprising electronic circuitry attached to a bottom side of the main logic board.

3. The battery pack for an electronic device of claim 1 wherein the battery portion is a lithium-ion battery.

4. The battery pack for an electronic device of claim 1 wherein the electronic device is a laptop computer.

5. The battery pack for an electronic device of claim 1 wherein the electronic device is a portable media player.

6. The battery pack for an electronic device of claim 1 wherein the power control module is outside the battery portion.

7. The battery pack for an electronic device of claim 1 wherein the power control module is not located in the battery portion.

8. A battery pack for an electronic device, the battery pack comprising:
   a housing;
   a main logic board in the housing;
   a battery portion in the housing;
   an electrode in the housing and attached to the battery portion; and
   a power control module directly contacting the electrode, wherein the main logic board and power control module are separate structures and are laterally adjacent to each other, and the battery portion completely overlies the power control module and at least partially overlies the main logic board.

9. The battery pack for an electronic device of claim 8 wherein the main logic board is positioned beneath the battery portion.

10. The battery pack for an electronic device of claim 8 wherein a portion of the electrode forms a U-shape.

11. An electronic device comprising:
    a battery pack including:
    a housing;
    a main logic board in the housing;
    a battery portion located in the housing;
    an electrode connected to the battery portion; and
    a power control module directly connected to the electrode, the power control module external to the battery portion,
    wherein the main logic board and power control module are located relative to each other in a first direction, and the battery portion is located relative to both the main logic board and the power control module in a second direction, the first direction orthogonal to the second direction.

12. The electronic device of claim 11 wherein the housing is flexible.

13. The electronic device of claim 11 wherein the housing has an inverted tray shape including a top surface and four sides, each side attached to the top surface of the housing.

14. The electronic device of claim 11 wherein the battery portion is located between a top surface and four sides of the battery pack housing and a top side of the main logic board.

15. The electronic device of claim 11 wherein the battery portion is a lithium-ion battery.

16. The electronic device of claim 11 wherein the power control module is not located in the battery portion.

17. The electronic device of claim 11 wherein a top side of the power control module is attached to a top side of the electrode.

18. The electronic device of claim 17 further comprising electronic circuitry attached to a bottom side of the main logic board.

* * * * *